US010172001B1

(12) United States Patent
Li et al.

(10) Patent No.: US 10,172,001 B1
(45) Date of Patent: Jan. 1, 2019

(54) AUTHENTICATION MECHANISM

(71) Applicant: INTERNATIONAL BUSINESS MACHINES CORPORATION, Armonk, NY (US)

(72) Inventors: Yao Xing Li, Beijing (CN); Han Ying Song, Xian (CN); Jian Dong Yin, Beijing (CN); Jun Feng Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/797,229

(22) Filed: Oct. 30, 2017

(51) Int. Cl.
| H04M 1/68 | (2006.01) |
| H04W 12/06 | (2009.01) |
| H04L 29/06 | (2006.01) |
| H04L 9/08 | (2006.01) |
| H04L 9/32 | (2006.01) |
| H04W 8/26 | (2009.01) |

(52) U.S. Cl.
CPC .......... H04W 12/06 (2013.01); H04L 9/0869 (2013.01); H04L 63/0876 (2013.01); H04L 9/32 (2013.01); H04W 8/26 (2013.01)

(58) Field of Classification Search
CPC ..... H04W 12/06; H04W 12/04; H04W 12/02; H04W 12/08
See application file for complete search history.

(56) References Cited

U.S. PATENT DOCUMENTS

| 7,221,949 B2 | 5/2007 | Clough |
| 8,027,665 B2 | 9/2011 | Frank |
| 8,510,804 B1 | 8/2013 | Bonn et al. |
| 9,456,348 B2 * | 9/2016 | Dennis ................. H04W 12/06 |
| 9,578,022 B2 | 2/2017 | Salonen |

(Continued)

FOREIGN PATENT DOCUMENTS

| CN | 103139204 A | 6/2013 |
| CN | 104320767 A | 1/2015 |

OTHER PUBLICATIONS

Peter Mell et al, The NIST Definition of Cloud Computing, National Institute of Standards and Technology, Publication 800-145, 2011, entire document.

(Continued)

*Primary Examiner* — Khalid Shaheed
(74) *Attorney, Agent, or Firm* — Patrick J. Daugherty; Daugherty & Del Zoppo Co., LPA

(57) ABSTRACT

Aspects provide an authentication mechanism wherein processors are configured to extract encoded identification indicia of a cellular service base station from authentication credentials received from a mobile cellular device for access to a secure networked resource on a network device connection. The identification indicia uniquely identify the base station relative to other, different base stations. Configured processors grants access by the mobile device to the secure networked resource in response to determining that the mobile device is currently using the identified base station for cellular services to transmit the authentication credentials; and deny access by the mobile device to the secure networked resource in response to determining that the mobile device is currently using another base station for cellular services to transmit the authentication credentials.

17 Claims, 5 Drawing Sheets

(56) References Cited

U.S. PATENT DOCUMENTS

| | | |
|---|---|---|
| 9,622,077 B2 | 4/2017 | Hughes et al. |
| 2007/0288392 A1 | 12/2007 | Peng et al. |
| 2009/0328163 A1 | 12/2009 | Preece |
| 2012/0290421 A1 | 11/2012 | Qawami et al. |
| 2013/0129091 A1* | 5/2013 | Kang .................... H04W 12/04 380/270 |
| 2015/0319665 A1* | 11/2015 | Bonneville ....... H04W 36/0038 455/411 |
| 2017/0264439 A1* | 9/2017 | Muhanna .............. H04L 9/0861 |

OTHER PUBLICATIONS

Azure App Service, Authentication and Authorization in Azure Mobile Apps, https://developer.salesforce.com/docs/atlas.en-us.mobile_sdk.meta/mobile_sdk/intro_oauth.htm, 2000-2017, entire document.

Salesforce developers, Mobile SDK Development Guide, Authentication, Security, and Identity in Mobile Apps, https://docs.microsoft.com/en-us/azure/app-service-mobile/app-service-mobile-auth, 2000-2017, entire document.

* cited by examiner

AUTHENTICATION MECHANISM

BACKGROUND

Mobile programmable devices (smart phones, tablets, laptop computers, etc.) enable a user to execute applications ("apps") within operating environments provided by said devices. Some apps enable users to use internet and other network connections to connect to other computerized devices that are physically remote from the user device (for example, servers, personal computers online within a local area network (LAN), cloud resources and applications, etc.), commonly via Hyper Text Transfer Protocol (HTTP) addresses and mechanisms. Such apps and supported connections may enable users to remotely access confidential and personal accounts and data stored on networked storage media or administered by service providers.

A variety of security mechanisms and processes are practiced in the prior art to protect confidential information accessible via such networked apps from unauthorized disclosure to others. For example, users may be required to present unique usernames and passwords to network interfaces in order to gain access to confidential networked resources, wherein security is ensured by the ability of the user to keep the usernames and passwords confidential and secure from disclosure to unauthorized entities (persons, organizations, automated bots and web crawlers, etc.), so that only the user or other entities authorized by the user (via provision of access to the username and password by the user) may gain access to the secure information. Reliability of such security systems and mechanisms is dependent upon the ability of the user and the secure networked resource mechanism or administrator to keep the unique usernames and passwords confidential or otherwise prevent their dissemination or compromise by unauthorized persons.

SUMMARY

In one aspect of the present invention, a computerized method for an authentication mechanism includes executing steps on a computer processor. Thus, a computer processor is configured to, in response to a receipt of authentication credentials from a mobile cellular device for access to a secure networked resource on a network device connection, extract encoded identification indicia of a cellular service base station from the authentication credentials. The identification indicia uniquely identify the base station relative to another base station that is different from the identified base station. The configured processor further grants access by the mobile device to the secure networked resource in response to determining that the mobile device is currently using the identified base station for cellular services to transmit the authentication credentials; and denies access by the mobile device to the secure networked resource in response to determining that the mobile device is currently using another base station for cellular services to transmit the authentication credentials.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to, in response to a receipt of authentication credentials from a mobile cellular device for access to a secure networked resource on a network device connection, extract encoded identification indicia of a cellular service base station from the authentication credentials. The identification indicia uniquely identify the base station relative to another base station that is different from the identified base station. The configured processor further grants access by the mobile device to the secure networked resource in response to determining that the mobile device is currently using the identified base station for cellular services to transmit the authentication credentials; and denies access by the mobile device to the secure networked resource in response to determining that the mobile device is currently using another base station for cellular services to transmit the authentication credentials.

In another aspect, a computer program product for an authentication mechanism has a computer-readable storage medium with computer readable program code embodied therewith. The computer readable hardware medium is not a transitory signal per se. The computer readable program code includes instructions for execution which cause the processor to, in response to a receipt of authentication credentials from a mobile cellular device for access to a secure networked resource on a network device connection, extract encoded identification indicia of a cellular service base station from the authentication credentials. The identification indicia uniquely identify the base station relative to another base station that is different from the identified base station. The configured processor further grants access by the mobile device to the secure networked resource in response to determining that the mobile device is currently using the identified base station for cellular services to transmit the authentication credentials; and denies access by the mobile device to the secure networked resource in response to determining that the mobile device is currently using another base station for cellular services to transmit the authentication credentials.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
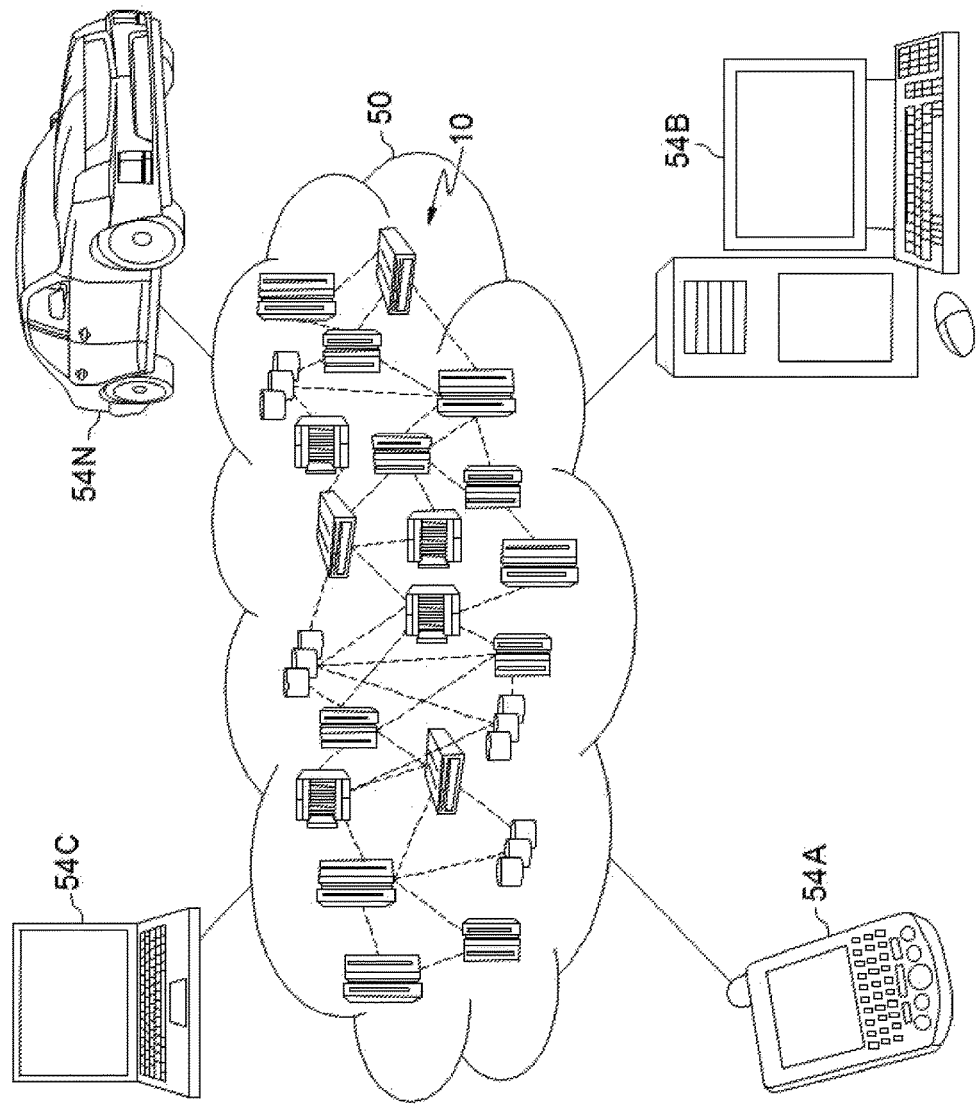
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
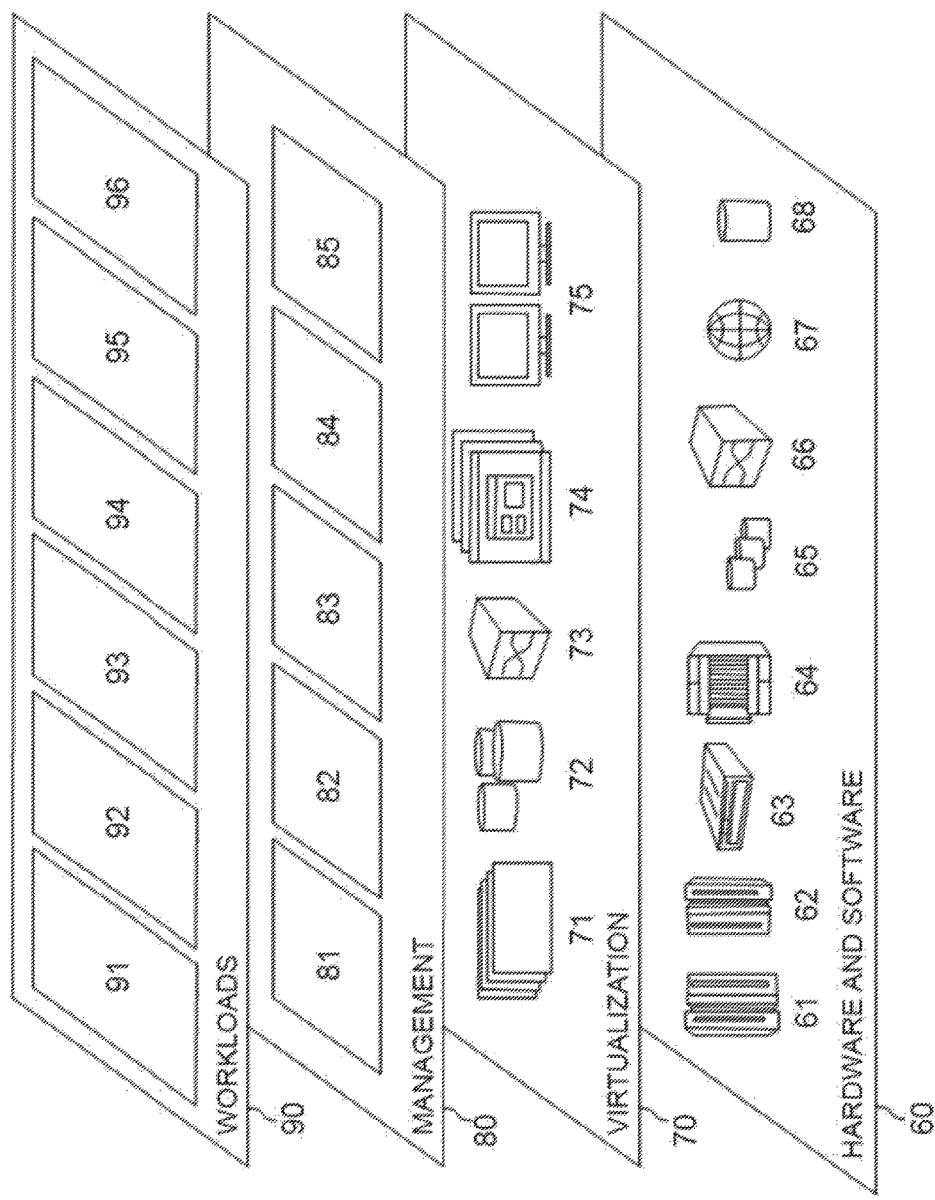
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for an authentication mechanism 96.

Figure 3:
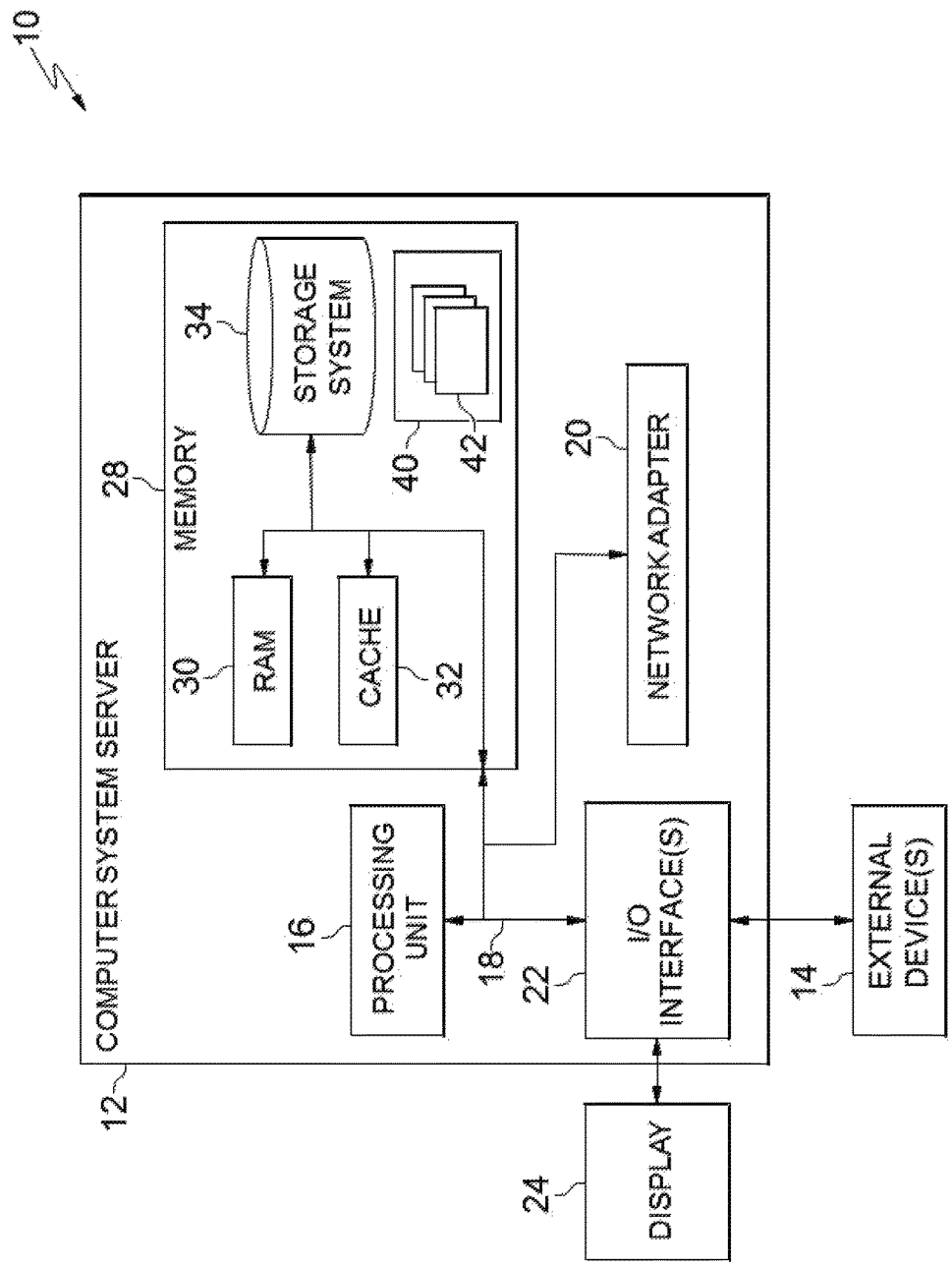
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Security mechanisms and processes practiced in the prior art to protect confidential information accessible via networked apps from unauthorized disclosure to others may be readily compromised through the theft or unintentional disclosure of confidential usernames and passwords that are required for presentation to secure resource administrators to gain access to confidential networked resources. User may thereby quickly experience loss of personal property and private information, in some examples before the user discovers the exposure and can take corrective or preventative measures, for example, by changing usernames and passwords, and notifying service providers of the unauthorized access or loss. If corrective or preventative measures are not timely implemented by the user or service provider in control of confidential and valuable personal information and assets (bank accounts, retirement accounts, etc.), the user may experience irrevocable or uncompensated losses and disclosures of the confidential information or personal assets.

Figure 4:
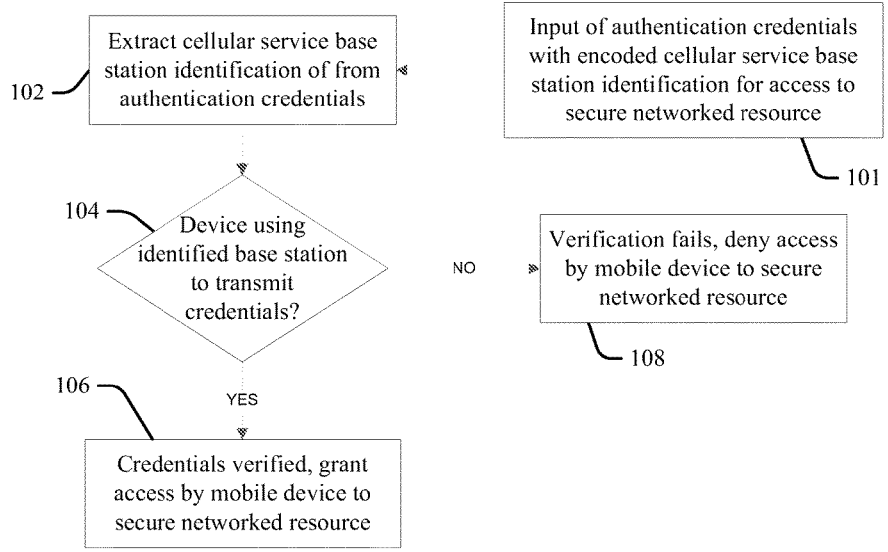
FIG. 4 is a flow chart illustration of an embodiment of the present invention.

FIG. 4 illustrates verification of user credentials for access to a secure networked resource via a mobile cellular device according to the present invention. At 101 an application executing on a mobile programmable cellular device (smart phone, tablet or laptop computer tethered to a cellular device or incorporating cellular communication components, etc.) submits authentication credentials to a network device connection (server port or web address, cloud storage application log-in window, etc.) for access to a secure networked resource, wherein the authentication credentials comprise encoded identification indicia of a cellular service base station that uniquely identifies the base station relative to any other base station.

In response to said request, at 102 a processor of the network device that is configured according to an aspect of the present invention (the "configured processor") decodes or otherwise extracts the identification of the cellular service base station from the authentication credentials input 101.

At 104 the configured processor determines whether the mobile device is using the identified base station to transmit the authentication credentials for access to the secure networked resource at 101.

If determined that the mobile device is using the identified base station for cellular services to transmit the authentication credentials, then at 106 the submitted credentials are verified and access by mobile device to the secure networked resource is granted.

Otherwise, if determined that the mobile device is using some other base station for cellular services to transmit the authentication credentials, then at 108 verification fails and access is denied by mobile device to the secure networked resource.

Cellular service base stations provide fixed points for radio frequency (RF) and other wireless communications to and from a cellular phone. The base station is generally connected to one or more antenna that receives and transmits signals in the cellular network to and from customer phones and cellular devices, and connects cellular calls to a public switched telephone network (PSTN) via mobile switching station structures. Cellular service base stations within a cellular service provider network are generally distributed and spaced apart from one another over a geographic area, wherein a cellular phone establishes a connection to the nearest base station, or to one otherwise located in a position arbitrated among other possible base stations to be best for establishing and maintaining radio signal communications relative to other base stations within the network.

While stationary with respect to geographic location, a cellular phone generally maintains a communication link to only one, closest or best-signal base station during voice and data communications over a cellular service, and thereby to the one that is closest and offers available bandwidth for the communications. Aspects of the present invention exploit this relationship to provide authentication creation and verification processes and services that are independent of and different from prior art location-based verification, but instead dependent upon identity of the base station in current communication with the mobile device. This is generally accomplished by generation of the authorization credentials proffered at 101 by a configured processor of a mobile device that is utilizing the identified base station, as is discussed more fully below.

More particularly, prior art security approaches that rely upon device location attributes typically verify that the mobile device is within some predetermined geographic zone (for example, within a service provider building or private residence or business location, or campus area of buildings, as contrasted with a public area) or is exchanging data on a private or secure local area network (LAN) or secure wide area network (WAN) (as contrasted with using a public WiFi network). In contrast, the type or nature of the mobile device location or cellular data network need not be determined in application of the present aspect of the invention, only whether the credential submitted directly identifies the specific cellular base station that receives the submission at 101 from the mobile device.

Figure 5:
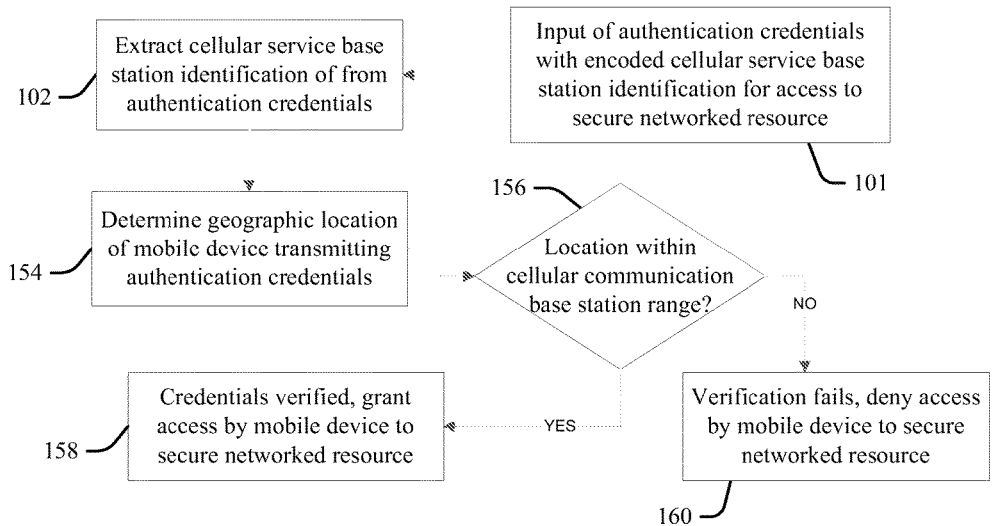
FIG. 5 is a flow chart illustration of an alternative embodiment of the present invention.

FIG. 5 illustrates an alternate embodiment of a process or system for verification of user credentials for access to a secure networked resource via a mobile cellular device according to the present invention. As described above with respect to FIG. 4, at 101 the application executing on the mobile programmable cellular device submits the authentication credentials to the network device connection for access to the secure networked resource, and in response at 102 the network device processor decodes/extracts the cellular service base station identification from the authentication credentials input 101.

At 154 the configured processor captures or determines a geographic location of the mobile device transmitting the authentication credentials at 101, and at 156 the configured processor determines whether the determined geographic location of the mobile device is within a threshold range for establishing cellular communication services with the identified base station.

Thus, if the geographic location is determined to be within the threshold range, then at 158 the submitted credentials are verified and access by mobile device to the secure networked resource is granted. Otherwise, if the geographic location is determined to be outside of the threshold range, then at 160 verification fails and access denied by mobile device to the secure networked resource.

The alternative embodiment of FIG. 5 is enabled to verify the credentials even if the mobile device is no longer communicating with the base station identified from the encoded credential information, in response to determining that the geographic location data of the mobile device is still within the threshold penumbra of cellular service coverage by the base station. This embodiment accommodates fluctuations in bandwidth demands and capability of the identified base station that may result in a denial of service to the mobile device, even though the device is still closest to the identified base station relative to other base stations.

Figure 6:
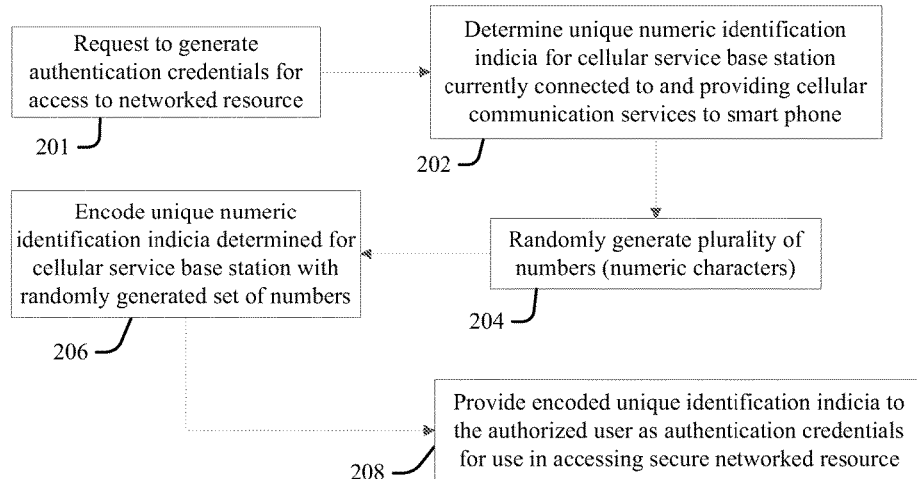
FIG. 6 is a flow chart illustration of an alternative embodiment of the present invention.

FIG. 6 illustrates one embodiment of a process or system according to the present invention for an authentication mechanism. Responsive to a request at 201 by an authorized user to generate authentication credentials for access to a secure networked resource, at 202 a processor of a smart phone that is configured according to an aspect of the present invention (the "configured processor") captures or determines unique numeric identification indicia of a cellular service base station that is currently connected to and providing cellular and data communication services to the smart phone from an associated cellular service provider. An authorized user is a user for whom identity and access credentials have been verified by a service provider (for example, the user has provided a unique user name and password combination, or has otherwise been verified as an authorized user). Aspects may determine the unique numeric identification indicia for the cellular service base station at 202 via an app executing on the configured processor that is network or remote communication with a server (the "app server") that obtains base station identification information from the relevant cellular service telecommunications provider. If non-numeric characters are included within the indicia returned from the relevant cellular service telecommunications provider (letters, symbols, etc.), the configured processor maps those non-numeric characters to numeric replacement characters in generating the unique identification at 202.

At 204 the configured processor randomly generates a set (plurality, group) of numeric characters, and at 206 securely encodes (encapsulates, concatenates, etc.) the unique numeric identification indicia determined for the cellular service base station with the generated set of randomly numeric characters.

At 208 the configured processor provides the encoded unique identification indicia to the authorized user as authentication credentials for use in accessing the secure networked resource.

Figure 7:
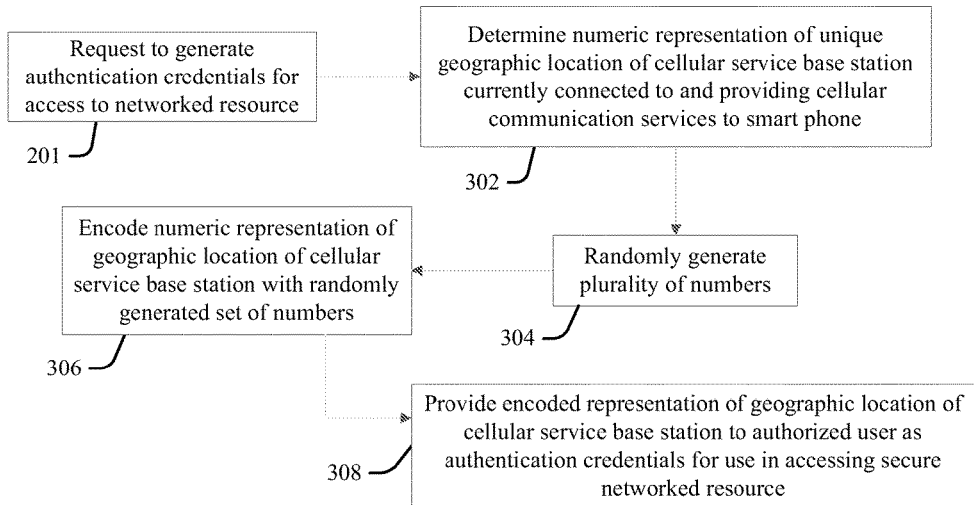
FIG. 7 is a flow chart illustration of an alternative embodiment of the present invention.

FIG. 7 illustrates an alternative embodiment of an aspect of the present invention, wherein at 302, responsive to the request at 201 by the authorized user to generate authentication credentials for access to the secure networked resource, a processor of a smart phone that is configured according to an aspect of the present invention (the "configured processor") captures or determines a numeric representation of a geographic location of cellular service base station currently connected to and providing cellular communication services to the smart phone. More particularly, the geographic location is determined at a precision or granularity so that it is distinguished from ("unique" with respect to) the locations of other cellular service base station providing cellular communication services. Aspects may determine the numeric geographic location indicia for the cellular service base station at 302 as global positioning system (GPS) coordinates determined for an address of the base station provided by the relevant cellular service telecommunications provider; still other unique geographic location indicia appropriate for use with the present aspect will be apparent to one skilled in the art.

At 304 the configured processor randomly generates a set (plurality, group) of numeric characters, at 306 securely encodes (encapsulates, concatenates, etc.) the numeric representation of the geographic location of cellular service base station with the generated set of randomly numeric characters, and at 308 provides the encoded representation of the geographic location of cellular service base station to the authorized user as authentication credentials for use in accessing the secure networked resource.

Corresponding processes of encoding the base station identification indicia within the authentication credentials, and of decoding/extracting the base station identification indicia from the authentication credentials, include "Base64" or "ASCII Armor" processes. "Base64" is a binary-to-text encoding scheme that represents binary data in an American Standard Code for Information Interchange (ASCII) string format by translating it into a radix-64 representation, wherein the radix or base is the number of unique digits, including zero, used to represent numbers in a positional numeral system. "Radix-64" incorporates the addition of an optional 24-bit Cyclic Redundancy Check (CRC), an error-detecting "checksum" code commonly used in digital networks and storage devices to detect accidental changes to raw data, wherein the checksum is calculated on the input data before encoding; the checksum is then encoded with the same Base64 algorithm and, using an additional "=" symbol as separator, appended to the encoded output data.

Decoding/extracting and corresponding encoding processes may also incorporate an encryption process utilizing public and private keys, wherein a randomly generated set of characters defines a public key, and the configured processor generates and retains a private key for use with the public key to decode encoded indicia. Still other encryption processes appropriate for practice in embodiments of the present invention will be apparent to one skilled in the art.

Prior art security credentials may provide for access to user accounts, wherein input verifies the user's authenticity when the user wants to check or view his private personal information, change a password of an account, pay for e-commerce transactions, log in to personal social accounts, etc. Some applications executing on a mobile device use tokens or cookies or other processes to save credentials on the device that are used to automatically populate the username and password fields of access web pages of secured and confidential accounts of the user. While these capabilities let the users quickly access their accounts with a minimum of effort and thereby enhance user satisfaction, they create a security vulnerability or exposure when the personal mobile device of the user is stolen or otherwise improperly used without authorization of the user. When a device is in an "unlocked" state an unauthorized party gaining access to the device may easily use such tokens or cookies saved to the device to automatically populate username and password fields within the secure accounts, enabling the unauthorized user to quickly access the confidential and valuable information and assets located thereon. Authentication codes may also be stolen or obtained by fraud and used on other devices.

By requiring that the credentials be submitted via communication with a same cellular base station that was used to generate the credentials (pursuant to the embodiments of FIGS. 6 and 7), aspects prevent the theft and re-location of the mobile device to another location not used by the authorized user. Under the prior art, an unauthorized user is enabled to use the device for unauthorized submission of the credentials from a variety of different base stations that are each located within a same authorized region (facility or campus, city neighborhood, etc.) or service provider network. Thus, the prior art will allow the access and thereby expose the user to loss of confidential information or assets, if the unauthorized user remains within the authorized region or on the authorized network.

In contrast, where a region otherwise authorized for credential submission in the prior art spans the coverage of multiple, different base cellular base stations, aspects of the present invention prevent submission of the credentials via another (second) cell base station that is different from the (first) one used in generating the credentials, when the user's device moves away from the range of the first base station and into the range of the second base station, or otherwise switches over to use the second base station for cellular communications. This provides additional, enhanced security steps and processes to ensure that the authorized user is in fact using the mobile device containing the proffered credentials, at a finer location granularity within otherwise authorized geographic locations, thereby preventing some unauthorized accesses that will not be prevented within the prior art teachings.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for an authentication mechanism, the method comprising executing on a computer processor:
   in response to a cellular services request from a mobile cellular device to generate authentication credentials for access to a secure networked resource via an identified cellular service base station, determining unique numeric identification indicia of the identified base station;
   randomly generating a plurality of numeric characters;
   generating authentication credentials by encoding the unique numeric identification indicia of the identified base station as a function of the randomly generated plurality of numeric characters;
   in response to a receipt of the authentication credentials from the mobile cellular device for access to the secure networked resource on a network device connection, extracting encoded identification indicia of the identified base station from the authentication credentials, wherein the identification indicia uniquely identify the identified base station relative to another base station that is different from the identified base station;
   granting access for the mobile device to the secure networked resource in response to determining that the mobile device is currently using the identified base station for cellular services to transmit the authentication credentials; and
   denying access for the mobile device to the secure networked resource in response to determining that the mobile device is currently using the another base station for cellular services to transmit the authentication credentials.

2. The method of claim 1, further comprising:
   determining a geographic location of the mobile device transmitting the authentication credentials;
   granting access for the mobile device to the secure networked resource in response to determining that the geographic location of the mobile device is within a threshold range for establishing cellular communication services with the identified base station; and
   denying access for the mobile device to the secure networked resource in response to determining that the geographic location of the mobile device is outside of the threshold range.

3. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the determining the unique numeric identification indicia of the identified base station, the randomly generating the plurality of numeric characters, the generating the authentication credentials, the extracting the encoded identification indicia of the identified base station from the authentication credentials in response to the receipt of the authentication credentials from the mobile cellular device for access to the secure networked resource on the network device connection, the granting access for the mobile device to the secure networked resource in response to determining that the mobile device is currently using the identified base station for cellular services to transmit the authentication credentials; and the denying access for the mobile device to the secure networked resource in response to determining that the mobile device is currently using the another base station for cellular services to transmit the authentication credentials.

4. The method of claim 3, wherein the computer-readable program code is provided as a service in a cloud environment.

5. The method of claim 1, wherein the generating the authentication credentials further comprises:
   using a binary-to-text encoding scheme to translate binary data in an American Standard Code for Information Interchange string format into a radix-64 representation.

6. The method of claim 1, wherein the determining the unique numeric identification indicia of the identified base station as global positioning system coordinates for an address of an identified base station.

7. The method of claim 6, wherein the generating the authentication credentials by encoding the unique numeric identification indicia of the identified base station as the function of the randomly generated plurality of numeric characters further comprises:
    mapping non-numeric characters of the unique numeric identification indicia to numeric replacement characters.

8. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
in response to a cellular services request from a mobile cellular device to generate authentication credentials for access to a secure networked resource via an identified cellular service base station, determines unique numeric identification indicia of the identified base station;
randomly generates a plurality of numeric characters;
generates authentication credentials by encoding the unique numeric identification indicia of the identified base station as a function of the randomly generated plurality of numeric characters;
in response to a receipt of the authentication credentials from the mobile cellular device for access to the secure networked resource on a network device connection, extracts encoded identification indicia of the identified base station from the authentication credentials, wherein the identification indicia uniquely identify the identified base station relative to another base station that is different from the identified base station;
grants access for the mobile device to the secure networked resource in response to determining that the mobile device is currently using the identified base station for cellular services to transmit the authentication credentials; and
denies access for the mobile device to the secure networked resource in response to determining that the mobile device is currently using the another base station for cellular services to transmit the authentication credentials.

9. The system of claim 8, wherein the processor executes the program instructions stored on the computer-readable storage medium via the computer readable memory and thereby further:
    determines a geographic location of the mobile device transmitting the authentication credentials;
    grants access for the mobile device to the secure networked resource in response to determining that the geographic location of the mobile device is within a threshold range for establishing cellular communication services with the identified base station; and
    denies access for the mobile device to the secure networked resource in response to determining that the geographic location of the mobile device is outside of the threshold range.

10. The system of claim 8, wherein the processor executes the program instructions stored on the computer-readable storage medium via the computer readable memory and thereby further:
    generates the authentication credentials by using a binary-to-text encoding scheme to translate binary data in an American Standard Code for Information Interchange string format into a radix-64 representation.

11. The system of claim 8, wherein the processor executes the program instructions stored on the computer-readable storage medium via the computer readable memory and thereby further:
    determines the unique numeric identification indicia of the identified base station as global positioning system coordinates for an address of an identified base station.

12. The system of claim 11, wherein the processor executes the program instructions stored on the computer-readable storage medium via the computer readable memory and thereby further:
    generates the authentication credentials by mapping non-numeric characters of the unique numeric identification indicia to numeric replacement characters.

13. A computer program product for an authentication mechanism, the computer program product comprising:
a computer readable storage medium having computer readable program code embodied therewith, wherein the computer readable storage medium is not a transitory signal per se, the computer readable program code comprising instructions for execution by a processor that cause the processor to:
in response to a cellular services request from a mobile cellular device to generate authentication credentials for access to a secure networked resource via an identified cellular service base station, determine unique numeric identification indicia of the identified base station:
randomly generate a plurality of numeric characters;
generate authentication credentials by encoding the unique numeric identification indicia of the identified base station as a function of the randomly generated plurality of numeric characters;
in response to a receipt of the authentication credentials from the mobile cellular device for access to the secure networked resource on a network device connection, extract encoded identification indicia of the identified cellular service base station from the authentication credentials, wherein the identification indicia uniquely identify the identified base station relative to another base station that is different from the identified base station;
grant access for the mobile device to the secure networked resource in response to determining that the mobile device is currently using the identified base station for cellular services to transmit the authentication credentials; and
deny access for the mobile device to the secure networked resource in response to determining that the mobile device is currently using the another base station for cellular services to transmit the authentication credentials.

14. The computer program product of claim 13, wherein the computer readable program code instructions for execution by the processor further cause the processor to:
    determine a geographic location of the mobile device transmitting the authentication credentials;
    grant access for the mobile device to the secure networked resource in response to determining that the geographic location of the mobile device is within a threshold range for establishing cellular communication services with the identified base station; and
    deny access for the mobile device to the secure networked resource in response to determining that the geographic location of the mobile device is outside of the threshold range.

15. The computer program product of claim 13, wherein the computer readable program code instructions for execution by the processor further cause the processor to:
  generate the authentication credentials by using a binary-to-text encoding scheme to translate binary data in an American Standard Code for Information Interchange string format into a radix-64 representation.

16. The computer program product of claim 13, wherein the computer readable program code instructions for execution by the processor further cause the processor to:
  determine the unique numeric identification indicia of the identified base station as global positioning system coordinates for an address of an identified base station.

17. The computer program product of claim 16, wherein the computer readable program code instructions for execution by the processor further cause the processor to:
  generate the authentication credentials by mapping non-numeric characters of the unique numeric identification indicia to numeric replacement characters.

* * * * *